United States Patent
Walkenstein

(10) Patent No.: US 6,911,652 B2
(45) Date of Patent: Jun. 28, 2005

(54) LOW LIGHT IMAGING DEVICE

(76) Inventor: Jonathan A. Walkenstein, 7065 SW. 107 Ter., Pinecrest, FL (US) 33156

(*) Notice: Subject to any disclaimer, the term of this patent is extended or adjusted under 35 U.S.C. 154(b) by 120 days.

(21) Appl. No.: 10/371,179

(22) Filed: Feb. 20, 2003

(65) Prior Publication Data
US 2003/0222216 A1 Dec. 4, 2003

Related U.S. Application Data

(63) Continuation-in-part of application No. 09/532,635, filed on Mar. 22, 2000, now abandoned.

(51) Int. Cl.[7] .............................................. H01L 31/00
(52) U.S. Cl. ..................................................... 250/330
(58) Field of Search ........................................ 250/330

(56) References Cited

U.S. PATENT DOCUMENTS

| | | |
|---|---|---|
| 3,812,526 A | 5/1974 | Tan |
| 3,863,093 A | 1/1975 | Orthuber |
| 3,987,299 A | 10/1976 | Mulder |
| 4,016,597 A | 4/1977 | Dillon et al. |
| 4,085,421 A | 4/1978 | Gilmour |
| 4,086,616 A | 4/1978 | Catano et al. |
| 4,374,325 A | 2/1983 | Howorth |
| 4,437,111 A | 3/1984 | Inai et al. |
| 4,652,739 A | 3/1987 | Sciamanda et al. |
| 4,804,843 A | 2/1989 | Hall |
| 4,967,276 A * | 10/1990 | Murakami et al. .......... 348/164 |
| 5,001,558 A | 3/1991 | Burley et al. |
| 5,103,301 A | 4/1992 | Cosentino |
| 5,162,647 A | 11/1992 | Field, Jr. |
| 5,214,503 A | 5/1993 | Chiu et al. |
| 5,483,379 A | 1/1996 | Svanberg et al. |
| H1599 H | 10/1996 | Task et al. |
| 5,656,813 A | 8/1997 | Moore et al. |
| 5,756,989 A | 5/1998 | Bear et al. |

FOREIGN PATENT DOCUMENTS

GB    2 143 397 A    2/1985

* cited by examiner

Primary Examiner—Constantine Hannaher
(74) Attorney, Agent, or Firm—Malloy & Malloy, P.A.

(57) ABSTRACT

A low light imaging device including an optical input structured to define a line of sight, a thermal imaging assembly responsive to radiation signatures disposed within the line of sight, an image intensification assembly responsive to photons within the line of sight, and an optical output structured to provide an output image to be viewed. The thermal imaging assembly generates a thermal image representative of the radiation signatures, and a thermal image adjustment assembly is provided to adjust an amount of the thermal image which defines the output image. Similarly, the image intensification assembly generates an enhanced photon based image, a photon image adjustment assembly being provided to adjust an amount of the enhanced photon based image which defines the output image. An output image generation assembly is included to generate the output image from adjusted the thermal image and enhanced photon based image.

7 Claims, 1 Drawing Sheet

LOW LIGHT IMAGING DEVICE

CLAIM OF PRIORITY

The present application is a continuation-in-part application of previously filed, application having Ser. No. 09/532,635, filed on Mar. 22, 2000 now abandoned.

BACKGROUND OF THE INVENTION

1. Field of the Invention

The present invention relates to a low light imaging device which permits a user to combine the benefits of multiple types of low light imaging technology in order to obtain an enhanced and more effective image that is particularly suited for a tactical environment, while also minimizing the disadvantages and/or visibility limiting characteristics of certain types of technologies, if necessary, within a compact, transportable, weapon mountable viewing device.

2. Description of the Related Art

The field of art related to low light imaging technology is quite crowded, and quite technologically advanced, with often minor variations in the structure providing significant tactical advances in the real world application. A primary reason for the significance of such advances is often the tactical environment in which these low light imaging devices are used. Specifically, such low light the imaging devices are often utilized by military and law-enforcement personnel in tactical and often dangerous environments where insufficient lighting is present and/or tactical surprise is a requirement.

One primary type of low light imaging device that is frequently utilized includes what is often referred to as "night vision". Night vision type devices typically operate through the amplification or enhancement of the photons visible by the device in a particular tactical environment. Specifically, such devices will perceive the available photons (typically light waves reflecting off of objects within the tactical field of view) and will significantly amplify the photons to a point where they are effectively visible by a user of the device. As can be appreciated, however, because some illumination is necessary in order for at least some photons to be perceived by the night vision device, there are some tactical situations wherein such night vision devices are not practical or truly useful. One example of such an environment is a totally dark environment wherein no illumination or very little illumination is present, and therefore, an insufficient amplified image can be generated. In such circumstances, the night vision device is truly ineffective and the user is a left without any tactical advantage or ability to ascertain their surroundings. In addition to such low or no light tactical environments, such night vision devices often prove ineffective in an overly illuminated tactical environments. For example, if excessive lighting is present, an overly amplified image that cannot be readily distinguished by the user may be generated by the night vision device. Additionally, in many search and rescue operations, especially within a dangerous tactical environment, personnel on the ground to be identified or rescued will often utilize infrared beacons. These infrared beacons are configured to emit a large amount of infrared light or photons in order to pinpoint the user's position. Although the large amount of infrared photons are not visible to the naked eye, when viewed through a photon enhancing night vision device, the illumination is quite clear, providing a clear indicator of the sources location. It is also, however, often so bright as to mask specific details within the tactical environment. As a result, conventional light amplification, night vision devices are not effective for conventional use in all environments and in all tactical situations.

Another type of low light imaging device relates to a class of thermal imaging devices. Specifically, thermal imaging devices are able to perceive thermal signatures emitted by hot items, such as a human, and indeed, most physical structures. The most conventional type of thermal imaging device is generally known as a Forward Looking Infrared Device or FLIR. In particular such FLIR systems normally operate by passively sensing objects via their reflected or emitted infrared radiation. Unlike optical imaging systems, FLIR systems perceive the object's thermodynamic state and accordingly, generate an image therefrom. As a result, even in a low or no light environment, such FLIR systems have the ability to identify thermal signatures of objects present within the tactical environment, and can correspondingly generates an appropriate image. Conversely, however, in some circumstances FLIR systems do not provide a sufficiently clear image and/or may be blocked by other objects which can mask or interfere with a the perception of emitted infrared radiation. Moreover, in a tactical rescue environment, as previously recited, it is desirable to be able to effectively and clearly identify an infrared beacon so as to maximize a rescue or recovery effort. In the such an environment, the FLIR systems is not able to distinguish the infrared light photons, and cannot therefore pinpoint the target. In this regard, it is noted that infrared radiation, which is representative of the thermodynamic characteristics of an object, differs from light photons within the infrared wavelength range.

Accordingly, there is a need in the art for a low light imaging device which is capable of efficiently and effectively taking advantage of the benefits to be derived from various different types of low light imaging devices, while also minimizing the deficiencies exhibited by each type. Such a device should be sufficiently compact so as to be usable in a variety of tactical environments, and preferably should be configured for effective mounting on weapons utilized in a tactical environments. Also, such an improved low light imaging device should also preferably be sufficiently adjustable so as to allow a user in a tactical environment to effectively adjust or modify the image to suit their particular needs, at a particular point in time.

SUMMARY OF THE INVENTION

The present invention is directed towards a low light imaging device which includes preferably a single optical input which defines a line of sight of the device. It is preferably objects and images disposed within this line of sight that define the area to be viewed or perceived by the low light imaging device.

The low light imaging device further includes a thermal imaging assembly. The thermal imaging assembly is responsive to radiation signatures disposed within the line of sight. As such, the thermal imaging assembly is structured to generate a thermal image that is representative of the perceived radiation signatures.

In addition to the thermal imaging assembly, the present low light imaging device further includes an image intensification assembly. The image intensification assembly is responsive to photons within the line of sight defined by the optical input. Typically these photons include light waves that reflect off of objects within the viewed area. In the case of a low light environment, the image intensification assembly is structured to amplify the perceived photons in order to generate an enhanced photon based image that is viewable by a user of the device.

The low light imaging device of the present invention further includes an optical output. The optical output is structured to provide the output image to be viewed by a user of the present invention in a readily viewable format. Preferably in association with an output image generation assembly, the output image is generated from both the thermal image and the enhanced photon based image. So as to allow the user to modify the output image to correspond the needs of a particular tactical environment, a thermal image adjustment assembly and a photon image adjustment assembly are further provided. Specifically, the thermal image adjustment assembly is structured to adjust an extent to which the thermal image defines the viewed output image. Similarly, the photon image adjustment assembly is structured to adjust an extent to which the enhanced photons based image defines the output image. Accordingly, a user is able to modify the nature of the output image.

These and other features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the drawings in which.

Like references numerals refer to like parts throughout the several views of the drawings.

DETAILED DESCRIPTION OF THE PREFERRED EMBODIMENT

Figure 3:
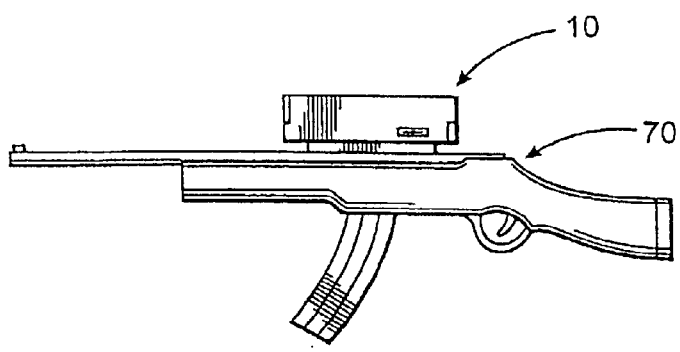
FIG. 3 is an illustration of an embodiment of the present invention operatively mounted on a weapon.

Shown in the figures, the present invention is directed to a low light imaging device, generally indicated as 10. The low light imaging device 10 is preferably structured for use within a tactical environment wherein insufficient lighting is available and/or stealth is required. Furthermore, the present low light imaging device 10 may be included as part of an independent viewing assembly, or as in the illustrated embodiment of FIG. 3, as a compact, weapon mounted assembly. Also, although a goggle or bi-ocular type of device may be utilized, a device with a single viewing aperture, as described with regard to the illustrated embodiment, is preferred.

Looking specifically to the embodiment of the illustrations, the low light imaging device 10 is preferably defined within a generally compact, preferably rigid housing 60. The housing 60 is structured to substantially contain each of the components of the low light imaging device 10 so as to facilitate use and transport of the device. Moreover, a mounting assembly 62 is also preferably provided and secured to the housing 60 so as to facilitate mounting of the present low light imaging device 10 to a weapon 70. Of course, the mounting assembly 62 may be adjustable and may be utilized to secure the low light imaging device 10 to a tripod, a fixed platform, or an alternate structure. Also, the imaging device 10 may be fitted so as to be transported and utilized in a form similar to binoculars or goggles.

The low light imaging device 10 includes an optical input 20. Specifically the optical input 20 defines a line of sight through which a tactical environment may be viewed. In this regard, it is understood that the line of sight may be varied and or adjusted in a manner consistent with a variety of optical devices. As such, the optical input 20 may include a single lens or may include a telescopic lens type structure having a fixed or variable magnification.

Preferably disposed within the housing is a thermal imaging assembly 30. The thermal imaging assembly 30 is responsive to radiation signatures of items disposed within the line of sight defined by the optical input 20. Specifically, the thermal imaging assembly 30 is preferably of a class of imaging assemblies which are able to detect or identify thermal energy emitted or radiated by a particular object. Although a variety of different types of thermal imaging assemblies may be provided, in the illustrated embodiment, the thermal imaging assembly 30 preferably includes an infrared imaging device. Such infrared imaging devices are often referred to as FLIR or forward looking infrared devices, which are conventionally utilized in a variety of tactical environments, and are configured to be responsive to an objects infrared radiation signature. As such, from the infrared radiation, the thermal imaging assembly 30 is able to generate a thermal image of the tactical environment perceived through the optical input 20.

In the illustrated embodiment, the thermal imaging assembly 30 preferably also includes a power supply 32 as well as an output display 34. Specifically, such thermal imaging assembly's 30 typically include a corresponding output display 34 which provides the thermal image in a readily viewable state. Of course, it is understood that the output display 34 of the thermal imaging assembly may be integrated into one or more of the optical output structures to be described. Regardless, however, the thermal imaging assembly 30 is structured to generate a thermal image which will comprise at least a portion of an output image to be viewed by a user of the low light imaging device 10 of the present invention.

Integrated with the thermal imaging assembly 30 within the low light imaging device 10 of the present invention is an image intensification assembly 40. Specifically, the image intensification assembly 40 is responsive to photons within the line of sight, and will amplify those perceived photons in order to generate an enhanced photon based image which can be viewed by a user. In the illustrated embodiment, the image intensification assembly 40 preferably includes a response assembly 41 that is responsive to the photons that are perceived through the optical input 20. As such, the response assembly 41 is preferably disposed in visually aligned relation with the optical input 20 so as to effectively view the same tactical environment that is being perceived by the thermal imaging assembly 30. Looking in further detail to the response assembly 41, it is structured to emit at least one electron in response to each photon detected thereby. Moreover, the electrons are generated by the response assembly 41 in generally aligned relation with a detected point of the photons. Accordingly, each electron corresponds a particular detected photon and is communicated to an amplification assembly 40, which is also preferably part of the image intensification assembly 40. Specifically, the amplification assembly 40 receives the electron generated by the response assembly 41 and multiplies that electron, generating a plurality of the electrons, also in substantially direct alignment with a generation point of the electron from the response assembly 41. Lastly, in the illustrated embodiment of the image intensification assembly 40, a photon generation assembly 43 is also provided. The photons generation assembly 43 is responsive to the plurality of electrons generated by the amplification assembly 40 and accordingly generates an image photon. The image photon is generated in substantially direct alignment with an emission point of the plurality of electrons, but is of an increased intensity that corresponds to the increased quantity of electrons generated by the amplification assembly 40. As a result, the enhanced photon based image is provided. Although a variety of such night vision type image intensification assembly's 40 may be provided, one example is found in the U.S. patent applications Ser. Nos. 09/062,141 and 09/206,992, the contents of which are incorporated herein by reference.

Figure 1:
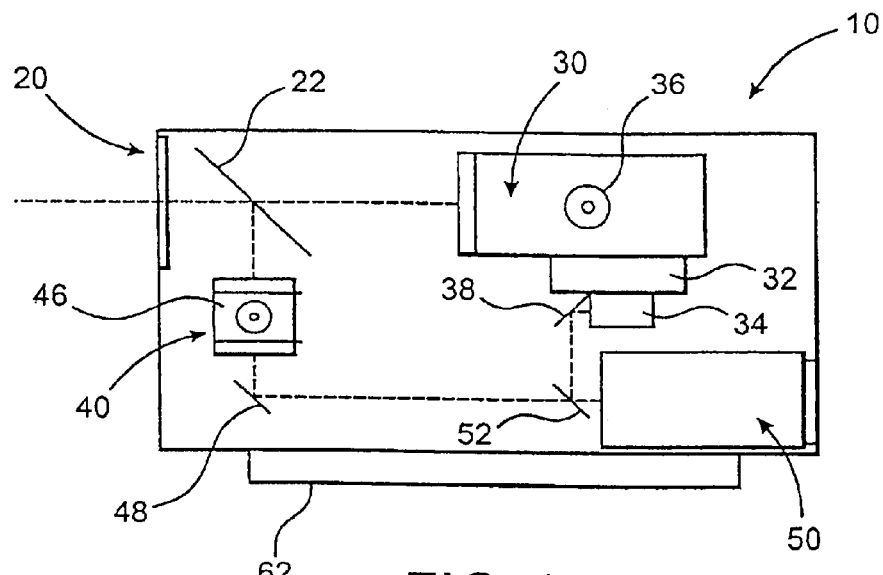
FIG. 1 is a schematic representation of an embodiment of the low light imaging device of the present invention.
Figure 2:
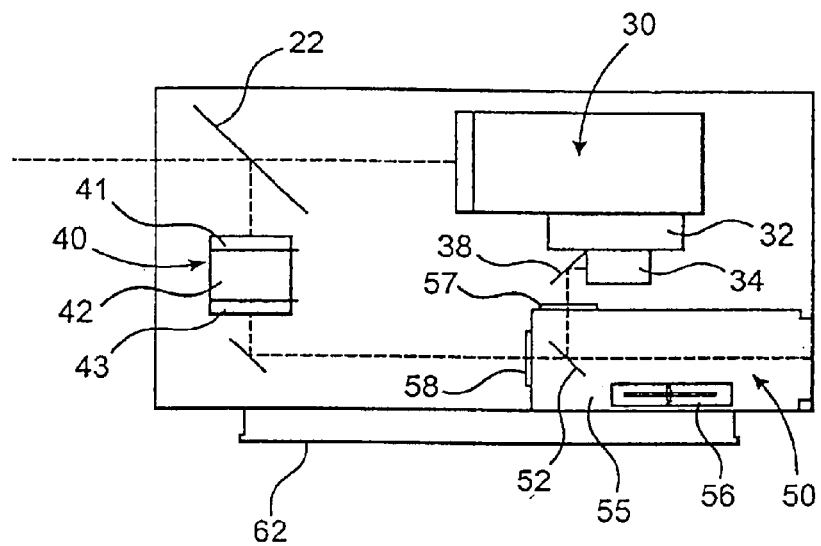
FIG. 2 is a schematic representation of another embodiment of the low light imaging device of the present invention.

So as to permit viewing of the output image by a user, the present invention further includes an optical output 50. Specifically, the optical output 50 may include an eye piece, viewing screen or monitor that allows a user of the low light imaging device 10 to effectively view the tactical environment. Operatively associated with the optical output 50, and possibly integrally incorporated therewith, is an output image generation assembly, generally 55 in the embodiment of FIG. 2. The output image generation assembly is structured to generate the output image from both the thermal image and the enhanced photon based image, thereby effectively combining the advantages to be derived from each of the two types of images. In the embodiment of FIG. 1, the output image generation assembly preferably includes a beam re-combiner. The beam re-combiner 52 is positioned to receive the thermal image from the thermal imaging assembly 30 and the enhanced photon based image from the image intensification assembly 40. Referring to FIGS. 1 and 2, a mirror is preferably positions to correspondingly direct the select image to the beam re-combiner 52. For example, a mirror 38 may be disposed in operative proximity to the output display 34 of the thermal image assembly 30, while another mirror 48 may be disposed in operative proximity to the image intensification assembly 40. In this regard, the images will generally overlap one another to produce a single, composite output image viewable by a user through the optical output 50. In the alternative embodiment of FIG. 2, to be further defined subsequently, the beam re-combiner 52 defines a portion of the output image generation assembly 55. Of course, it is understood that other means to combine or overlap two or more images may be effectively provided, so long as a preferably compact and substantially real time configuration is maintained.

The present low light imaging device 10 also preferably includes a thermal image adjustment assembly and a photon image adjustment assembly. Looking first to the embodiment of FIG. 1, the thermal image adjustment assembly is preferably directly associated with the thermal imaging assembly 30, and is structured to adjust an output of the thermal imaging assembly 30, such as by increasing or decreasing the gain on the thermal image produced. As such, the thermal image adjustment assembly 36, which may include an exteriorly actuatable knob or button allows a user within the tactical environment to effectively increase or decrease how much of the output image is defined by the thermal image. Similarly, in the embodiment of FIG. 1, the photon image adjustment assembly of 46 is preferably directly associated with the image intensification assembly 40 so as to selectively increase or decrease the gain or intensity of the enhanced photon based image produced. The user is therefore also able to adjust an amount of the enhanced photon based image which defines the output image being viewed therethrough.

Looking to the embodiment of FIG. 2, the thermal image adjustment assembly and the photons image adjustment assembly may be integrated as part of an image adjustment assembly of the output image generation assembly 55 if direct control of the thermal imaging assembly 30 and/or the image intensification assembly 40 is not desired. In such an embodiment, the output image generation assembly 55 receives the thermal image and the enhanced photon based image in a generally non-adjusted state. It is therefore the output image generation assembly 55 that includes the image adjustment assembly that varies a degree to which the thermal image and the enhanced photon based image define the output image. Preferably, the image adjustment assembly includes both the thermal image adjustment assembly and the photons image adjustment assembly. By way of example only, in the embodiment of FIG. 2, an exterior actuator 56, such as a fader, button(s) or knob(s) 56 may be provided to correspondingly adjust or limit the amount of the thermal or photon based images that the re-combiner overlays. To this end, one or more filters 57, 58 may be provided and linked to the actuator 56 so as to provided a desired amount of adjustment for the user. Similarly, a conventional signal mixer may be provided and coupled to the fader type structure to provide the desired adjustment.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A low light imaging device comprising:
   a) an optical input structured to define a line of sight;
   b) a thermal imaging assembly responsive to radiation signatures disposed within said line of sight;
   c) an image intensification assembly responsive to photons at least within said line of sight;
   d) said thermal imaging assembly structured to generate a real time thermal image representative of said radiation signatures;
   e) said image intensification assembly structured to generate a real time enhanced photon based image;
   f) an image adjustment assembly including a thermal image adjustment assembly and a photon image adjustment assembly;
   g) said thermal image adjustment assembly structured to adjust an intensity of said thermal image;
   h) said photon image adjustment assembly structured to adjust said image intensification assembly so as to adjust an intensity of said enhanced photon based image generated thereby;
   i) said thermal image adjustment assembly and said photon image adjustment assembly being structured to be operable independent from one another; and
   j) an output image generation assembly structured to combine said thermal image and said enhanced photon based image to generate a real-time, direct view output image.

2. A low light imaging device as recited in claim 1 wherein said image intensification assembly comprises:
   a) a response assembly responsive to said photons under extremely low light conditions and structured to emit at least one electron in response to each of said photons detected thereby and in generally aligned relation with a detection point of said photon;

b) an amplification assembly structured and disposed to receive said electron generated by said response assembly and to generate a plurality of electrons in response thereto and in substantially direct alignment with a generation point of said electron from said response assembly; and c) a photon generation assembly responsive to said plurality of electrons generated by said amplification assembly and structured to generate an image photon in substantially direct alignment with an emission point of said plurality of electrons and of an increased intensity corresponding a quantity of said plurality of electrons generated by said amplification assembly so as to define said enhanced photon based image.

3. A low light imaging device as recited in claim 2 wherein said output image generation assembly includes at least one eye piece disposed in visually aligned communication with said photon generation assembly.

4. A low light imaging device as recited in claim 1 wherein said thermal image adjustment assembly and said photon image adjustment assembly are structured to be independently and separately adjusted relative to one another.

5. A low light imaging device comprising:

a) an optical input structured to define a line of sight;

b) a first imaging assembly structured to generate a thermal image corresponding to radiation signatures disposed at least within said line of sight;

c) a second imaging assembly structured to generate an enhanced photon based image upon detected photons disposed at least within said line of sight;

d) a first image adjustment assembly and a second image adjustment assembly, said first and said second image adjustment assemblies being operable to adjust said first and said second imaging assemblies so as to adjust an intensity of said thermal image and said enhanced photon based image generated thereby;

e) an output image generation assembly structured to combine said thermal image and said enhanced photon based image to generate a single output image.

6. A low light imaging device comprising:

a) an optical input structured to define a line of sight;

b) a thermal imaging assembly structured to generate a thermal image corresponding to radiation signatures disposed at least within said line of sight;

c) an image intensification assembly structured to generate an enhanced photon based image upon detected photons disposed at least within said line of sight;

d) a thermal image adjustment assembly and a photon image adjustment assembly, said thermal image adjustment assembly structured to adjust said thermal imaging assembly so as to adjust said thermal image generated thereby;

e) an output image generation assembly structured to combine said thermal image and said enhanced photon based image to generate a single output image.

7. A low light imaging device comprising:

a) an optical input structured to define a line of sight;

b) a thermal imaging assembly structured to generate a thermal image corresponding to radiation signatures disposed at least within said line of sight;

c) an image intensification assembly structured to generate an enhanced photon based image upon detected photons disposed at least within said line of sight;

d) a thermal image adjustment assembly and a photon image adjustment assembly, said photon image adjustment assembly structured to adjust said image intensification assembly so as to adjust said enhanced photon based image generated thereby;

e) an output image generation assembly structured to combine said thermal image and said enhanced photon based image to generate a single output image.

* * * * *